United States Patent
Bluem et al.

(12) 
(10) Patent No.: US 6,568,637 B2
(45) Date of Patent: May 27, 2003

(54) AIRCRAFT DOOR

(75) Inventors: Werner Bluem, Huisheim (DE); Jens Bold, Hamburg (DE); Guenther Klockow, Nordendorf (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/909,031

(22) Filed: Jul. 19, 2001

(65) Prior Publication Data
US 2002/0008179 A1 Jan. 24, 2002

(30) Foreign Application Priority Data
Jul. 20, 2000 (DE) .......................................... 100 35 349

(51) Int. Cl.[7] ............................... B64C 1/14; B64C 1/00
(52) U.S. Cl. ................................ 244/129.5; 244/117 R; 244/119
(58) Field of Search ....................... 244/129.5, 117 R, 244/119

(56) References Cited

U.S. PATENT DOCUMENTS

| | | |
|---|---|---|
| 2,665,459 A | 1/1954 | Lee |
| 3,085,297 A | 4/1963 | Linderfelt |
| 4,482,113 A | 11/1984 | Backlund et al. |
| 4,557,440 A | 12/1985 | Adams |
| 4,908,254 A | 3/1990 | Fischer et al. |
| 5,084,120 A | 1/1992 | Fischer et al. |
| 5,242,523 A * | 9/1993 | Willden et al. .............. 244/119 |
| 5,251,849 A * | 10/1993 | Torres .................... 244/117 R |
| 5,667,169 A * | 9/1997 | Erben et al. ............. 244/129.5 |
| 5,848,575 A | 12/1998 | Freeman et al. |
| 5,868,355 A * | 2/1999 | Carter, Jr. ................ 114/117 R |
| 6,019,315 A | 2/2000 | Scherer et al. |
| 6,116,542 A * | 9/2000 | Erben ....................... 244/129.5 |
| 6,168,114 B1 * | 1/2001 | Erben ....................... 244/129.5 |
| 6,293,496 B1 * | 9/2001 | Moe ........................... 244/119 |
| 6,454,211 B2 * | 9/2002 | Entelmann et al. ...... 244/129.5 |

FOREIGN PATENT DOCUMENTS

| | | | |
|---|---|---|---|
| FR | 2550754 | 2/1985 | |
| FR | 2612282 | 9/1988 | |
| FR | 2651527 | * 5/1989 | .............. 244/129.5 |
| US | 0512588 | * 11/1992 | .............. 244/129.5 |

* cited by examiner

Primary Examiner—Charles T. Jordan
Assistant Examiner—Lulit Semunegus
(74) Attorney, Agent, or Firm—W. F. Fasse; W. G. Fasse

(57) ABSTRACT

An aircraft door has a trough substantially closed by an outer planking (21) except for a vent that vents the space enclosed by the trough and the planking to the atmosphere outside of the aircraft. The door also includes a door stiffening door framing that is preferably but not necessarily mounted inside the trough or between a radially inner wall of the trough and an inner door cladding or covering. The trough is formed by a radially inwardly recessed portion of the outer door skin.

18 Claims, 2 Drawing Sheets

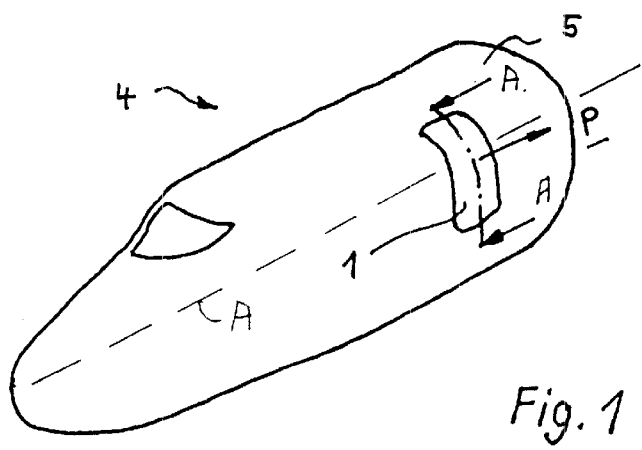
Fig. 1
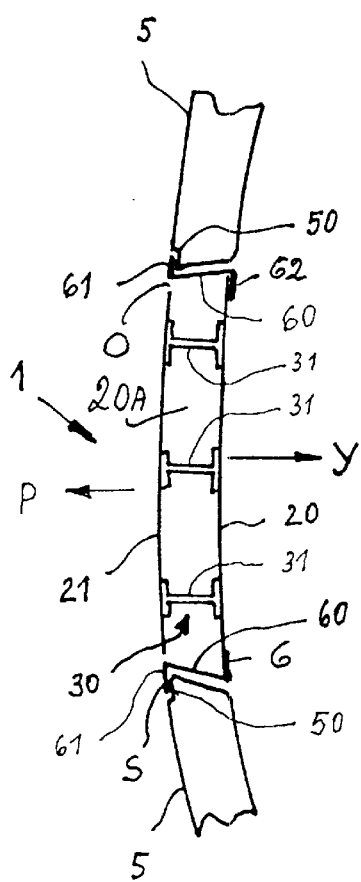 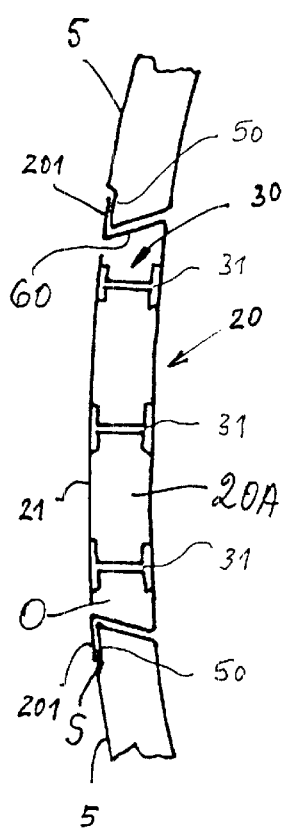 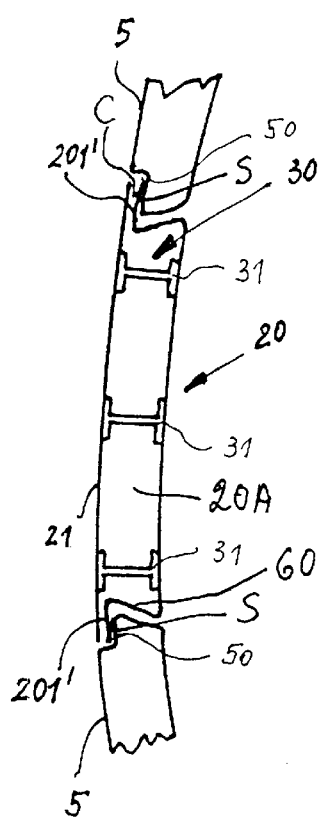
Fig. 2a   Fig. 2b   Fig. 2c

AIRCRAFT DOOR

PRIORITY CLAIM

This application is based on and claims the priority under 35 U.S.C. §119 of German Patent Application 100 35 349.5, filed on Jul. 20, 2000, the entire disclosure of which is incorporated herein by reference.

FIELD OF THE INVENTION

The invention relates to an aircraft door comprising at least a door framing and an outer skin connected therewith, which takes up pressure loads.

BACKGROUND INFORMATION

An aircraft comprises, as a rule, a passenger door, a freight gate and/or a freight trap door. The passenger door, the freight gate and the freight trap door are referred to in the following text by the term: door. The door has a wall hereinafter referred to as outer skin which conforms itself to the surrounding surface contour of an aircraft fuselage when the door is in the closed position, so that a seamless transition exists between the fuselage surface and the outer skin. This conforming of the outer skin to the fuselage contour exists in the circumferential direction of the fuselage and in the longitudinal direction of the fuselage.

The outer skin is connected to a door framing that provides the required stiffness to the outer skin. The door framing forms an internal door structure and must be distinguished from a door frame that surrounds a door opening in the fuselage. The outer skin forms an uninterrupted surface, which during flight does not produce any additional drag, while safely sealing the door opening of the aircraft fuselage. The outer skin corresponds to a so-called load bearing section or part of the door which is exposed to dynamic loads. This means, that during flight the outer skin must take-up pressure loads and aerodynamic loads. Pressure loads occur due to the pressure difference between the cabin interior and the outer atmosphere. Aerodynamic loads are, for example caused by vortices or atmospheric flows along the outer surface of the aircraft body. The outer skin of the door is, however, also exposed to so-called operating loads which are caused, for example by the preparation for passenger entering or leaving the aircraft when a stair or freight chute must be positioned to face the door. These operating loads may, in the most adverse instance, damage the outer skin. Such damage may, in the long run, be a cause for material failures of the outer skin during flight.

The outer skin of known doors is made of sheet metal having a substantially constant material thickness which is connected by rivets to the door framing. Other doors are also known wherein the outer skin and the door framing are manufactured as a single piece by casting. In both instances a door operating mechanism is installed in the intermediate spaces of the door framing. The operating mechanism includes electrical and mechanical subassemblies at least for opening and closing the door. The door framing is covered on its side facing into the cabin by a cladding. The cladding is a so-called no load bearing section or part of the door, which, compared to the outer skin need to take up substantially smaller loads. It is a disadvantage of known doors that they have a relatively large weight and that they cause relatively high production cost.

OBJECTS OF THE INVENTION

It is an object of the invention to further and noticeably reduce the weight of an aircraft door while satisfying the safety requirements and to also lower the manufacturing cost relative to known doors. Another object of the invention is to vent the inner space of an aircraft door to the outer atmosphere.

SUMMARY OF THE INVENTION

The outer skin of the present aircraft door is displaced radially inwardly relative to the surface contour of the fuselage, i.e. lowered or offset in the direction of the fuselage interior. Thus, a trough is formed. This trough or the inwardly displaced, offset surface of the outer skin is covered by a planking in an aerodynamically advantageous manner. For aerodynamic reasons the planking itself is adapted to the surface contour of the fuselage. The planking does not completely seal the trough formed by the outer skin. There should remain a venting connection in the form of a small covered vent opening, or of a small vent tube, or channel in order to achieve a pressure equalization inside the trough relative to the outer atmosphere that surrounds the aircraft. Thus, the offset outer skin which according to the invention forms the bottom of the trough continues to be exposed to the pressure difference between the outer atmosphere and the inner cabin pressure so that substantial pressure loads are kept off the planking that covers the trough outwardly except for the vent which assures that atmospheric pressure prevails on both sides of the planking.

It is an advantage of the invention that displacements caused by the pressure load gradient on the outer skin cannot be adversely effective in an aerodynamic sense on the outer skin. No additional measures need to be taken in order to noticeably reduce these displacements, whereby the effort and expense for manufacturing the door is reduced.

The invention has the further advantage that the effort and expense for a thermal insulation of the door can be noticeably reduced, because the trough shaped hollow space between the outer planking and the "outer" skin or rather the trough bottom can be used as an additional insulation.

Furthermore, the door operating mechanism for opening and closing the door can be installed advantageously in the trough shaped hollow space between the stiffening members forming the door framing. This door framing is at least connected with the outer skin or trough bottom and can carry or hold, for example, the outer planking.

According to a further embodiment of the invention only the outer skin itself is offset inwardly without also offsetting a skin flange extending in a circumferential direction around the trough. The skin flange of the outer skin is adapted to the surface contour of the fuselage to extend flush with the surface contour. A stiffening is achieved by this "trough shaped" configuration of the outer skin, whereby it becomes possible to avoid rib elements that were required heretofore. The present doors require either ribs or beams to form the framing but not both ribs and beams. This feature brings an advantage in the weight reduction and in the manufacturing.

In connection with this embodiment, the planking can merge into the contour of the flange of the outer skin. The planking would, in this case, only cover the surface of the offset outer skin but not the skin flange.

According to a further embodiment it would, however, be possible that the planking also fully covers the skin flange of the outer skin. The flange, thus, would also be offset somewhat inwardly relative to the surface contour of the fuselage. Thus, the planking could itself fit into the surface contour of the fuselage.

BRIEF DESCRIPTION OF THE DRAWINGS

The invention will be explained in the following with reference to example embodiments illustrated in the accompanying drawings, wherein:

FIG. 1 shows a schematic view of a fuselage segment with a door;

FIG. 2a shows a first schematic sectional view through an aircraft door according to the invention, along a section line A—A in FIG. 1, with an inwardly offset outer skin forming a trough covered by a planking;

FIG. 2b shows a view similar to that of FIG. 2a but illustrating a second embodiment of the invention with an offset outer skin having an outer flange that is not offset and with a planking;

FIG. 2c shows a view similar to that of FIG. 2b but illustrating a third embodiment of the invention with an offset outer skin and with a planking covering the outer flange which is only slightly offset.

Figure 3:
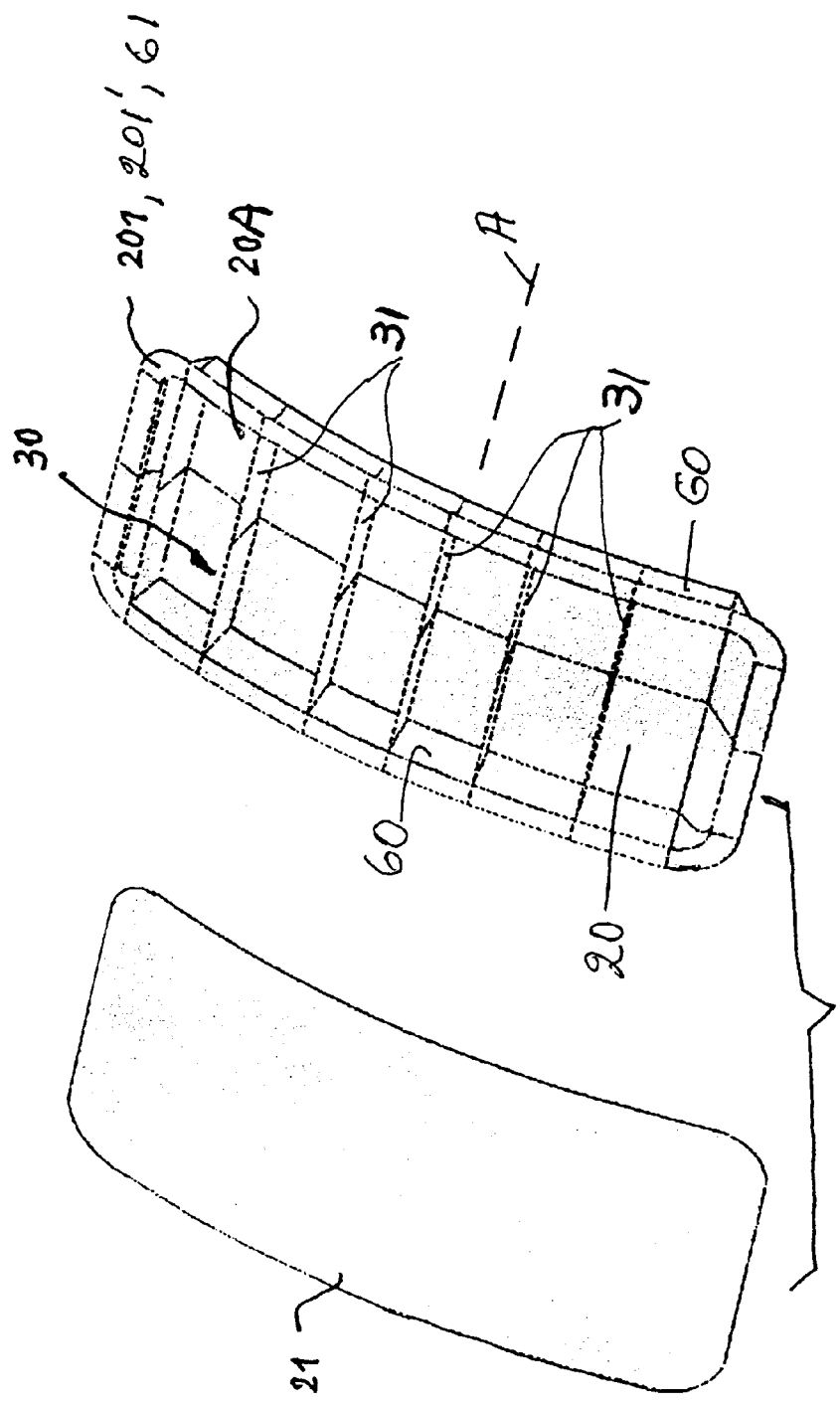
FIG. 3 shows a perspective view into the trough formed by the offset outer skin and illustrating a door framing inside the trough to be covered by an also shown outer planking.

DETAILED DESCRIPTION OF PREFERRED EXAMPLE EMBODIMENTS AND OF THE BEST MODE OF THE INVENTION

FIG. 1 shows that an aircraft door 1 in its closed position adapts itself or is flush with the surface contour 5 of an aircraft fuselage 4. Thus, the door does not cause any additional drag. The aircraft door 1 is vaulted in the circumferential direction corresponding to the surface contour 5 of the fuselage 4. The passenger and freight space is located behind the door inside the fuselage. During flight the aircraft door 1 is exposed to a pressure load P. The pressure load direction extends substantially from inside the fuselage radially outwardly of the fuselage 4. The term radially has reference to a central longitudinal axis A of the aircraft fuselage 4.

Features of the invention will be explained with reference to three different sectional views through the aircraft door 1 taken along section line A—A in FIG. 1, whereby each sectional view illustrates a different door embodiment of the invention.

FIG. 2a shows that the outer skin 20 of the aircraft door 1 is displaced or offset relative to the surface contour 5 of the fuselage 4, radially inwardly in the direction Y of the fuselage 4 to form a trough 20A. The radially inward displacement of the outer skin 20 is thus directed opposite to the radially outward pressure load direction P. A ring collar 60 is connected with or forms an integral part of the outer skin 20 along the circumference of the outer skin 20 whereby the ring collar 60 bears with its outer flange 61 against a stop 50 of the surface contour 5 to provide a Seal. Additional sealing means are not shown for simplicity's sake. The ring collar 60 also has an inner flange 62 connected to the inwardly offset portion of the outer skin 20 to complete the trough 20A. The trough 20A thus formed in the aircraft door 1 between the surface contour 5 and the outer skin 20 is capable of accepting or holding the door framing 30 as best seen in FIG. 3. The door framing 30 is preferably connected to the outer skin 20 which forms a bottom wall of the trough 20A. The door framing 30 is formed by beams 31 or ribs. Both, beams and ribs are not necessary because the offset trough has itself an inherent stiffness that contributes to the load bearing capability of the present door thereby reducing the door weight. However, the door framing 30 provides an additional stiffening of the outer skin 20. The trough 20A and the door framing 30 secured in the trough are covered by an outer planking 21. The outer planking 21 may be connected either to the door framing 30 and/or to the ring collar 60 or rather to the outer flange 61 of the ring collar 60. The planking 21 covers at least the surface area of the outer skin 20.

FIG. 2a also shows a vent opening O in the outer planking 21 for venting the space in the trough 20A to the atmosphere outside the aircraft, whereby the planking 21 does not have to support any pressure differential because atmospheric pressure prevails on both sides of the planking 21. The outer flange 61 of the ring collar 60 rests on a stop 50 formed in the fuselage 5 around the door opening.

FIG. 2b shows that the outer skin 20 is displaced and that the outer flange 201 of the skin 20 is not offset. The outer flange 201 extends circumferentially around the trough 20A, that is, the outer skin 20 is offset relative to its outer flange 201. In this case the flange 201 which extends along the circumference of the trough 20A, bears itself against a stop 50 of the fuselage 5 and contributes to the sealing of the door opening by a seal S. The planking 21 covers the area of the inwardly offset displaced outer skin but not the outer flange 201. An opening O in the planking 21 provides the vent as in FIG. 2a.

FIG. 2c shows another embodiment wherein the planking 21 covers the outer skin 20 entirely i.e. including the outer flange 201' of the trough 20A. The outer flange 201' is slightly offset radially inwardly sufficiently to form one or more venting channels C between the outer flange 201' and the planking 21 that covers the flange 201' outside of the venting channel of channels C. The flange 201' is also offset sufficiently so that the planking 21 can extend flush with the outer surface of the fuselage 5.

FIG. 3 shows a perspective exploded illustration of an aircraft door according to the invention. The door structure is formed by the outer skin 20, the door framing 30, the ring collar 60, the planking 21 and the outer flange 61, or 201 or 201'. The outer skin 20 is offset radially inwardly relative to the outer flange. Thus, the displaced or offset outer skin 20 lies in a curved plane which is displaced or offset radially into the interior of the fuselage relative to the curved plane of the outer flange, whereby a single piece trough 20A is formed in which the entire door framing or beams 31 are arranged for a further stiffening of the door trough. The beams 31 are arranged substantially in the longitudinal direction of the fuselage axis A. This configuration of the outer skin 20 or rather the single piece trough can, for example, be produced by deep drawing of an outer metallic skin. In an alternative embodiment with an outer skin made of fiber composite material, the trough configuration may be formed by a respective laminating in a trough forming mold. In both instances the radially inwardly displaced or offset contour of the single trough produces itself a certain stiffness. This feature has the advantage that door framing ribs in addition to longitudinal beams 31 are no longer necessary. This feature provides an advantageous weight reduction of the door because according to the invention either beams or ribs are sufficient for forming the door framing 30 in the single trough.

The outer skin 20 is now, as before, the pressure load carrying section of the door which is exposed to dynamic loads. Thus, any displacements produced by the compression load gradient, still occur on the outer skin 20 of the present door. However, advantageously these displacements can no longer be effective to cause drag because the "outer" skin is now inside the door. Hence, these displacements are acceptable up to a tolerable size. The outer skin 20 of the present door can no longer influence the drag because, in effect the outer door skin is no longer positioned flush with the fuselage surface.

In order to avoid drag of the displaced or offset outer skin 20, it is covered with the planking 21. The planking 21 is adapted to the surface contour 5 of the fuselage to extend flush with the outer fuselage contour. The planking 21 need not be connected to the outer skin fully sealed, rather as mentioned a pressure equalization to the outer atmosphere should be present, whereby substantial pressure loads are kept away from the planking 21. The planking 21 thus merely performs the function of a so-called no load bearing planking. Thus, FIGS. 2a, 2b, 2c show that the space inside the door, more specifically the trough shaped hollow space between the planking 21 and the outer skin is not hermetically sealed, rather it has a venting connection to the outer atmosphere. Such a venting connection can for example be constructed as the channel C, as a pipe conduit, a covered gap, or opening O which however does not influence the air flow along the outer fuselage contour. Advantageously the planking can seal the entire trough shaped hollow space except for a small pipe conduit or the like, which provides the desired pressure equalization inside the door. This construction according to the invention also has the advantage that the size, effort and expense for a thermal insulation of the door can be noticeably reduced, because the trough shaped hollow space located between the planking 21 and the outer skin 20 can be utilized as additional insulation. The operating mechanism at least for opening and closing the door can be accommodated in the trough shaped space between beams or ribs forming the door framing 30. Thus, the advantage is achieved that the integrated operating mechanism can be inspected from the outside without any problems by removing the planking 21.

The planking 21 is placed on the outside of the outer skin 20 and may be connected with the outer skin 20 or with the door framing 30. Advantageously the planking 21 merges into the surface contour 5 of the fuselage. However, the planking 21 could have a reduced area covering only the lowered or offset area of the outer skin 20 up to the respective outer flange so that the planking merges into the contour of the outer flange 61 or 201. The flange 61 or 201 in turn merges into the surface contour 5 of the fuselage 4. In FIG. 2c the planking 21 merges directly into the fuselage contour and covers the slightly recessed flange 201'.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft door fitting into a door opening of an aircraft fuselage having an outer contour and a longitudinal central axis, said aircraft door comprising a trough (20A) having a trough bottom wall which is displaced radially inwardly relative to said outer contour and toward said longitudinal central axis, said trough closing an interior of said aircraft fuselage against the external atmosphere, said trough fitting into said door opening, a door framing (30) in said trough for stiffening said aircraft door, said trough (20A) having a radially outwardly open surface opposite said trough bottom wall, and a planking (21) covering said radially outwardly open surface, said planking (21) extending flush with said outer contour (5) of said aircraft fuselage (4).

2. The aircraft door of claim 1, wherein said door framing (30) is mounted in said trough (20A) and connected at least with a part of said trough.

3. The aircraft door of claim 1, wherein said trough bottom wall is formed by a radially inwardly offset outer door skin (20), said trough further comprising a ring collar (60) connected to said trough bottom wall, said ring collar (60) extending circumferentially around said trough bottom wall, and wherein said ring collar (60) comprises an outer flange (61, 201) extending flush with said outer contour of said aircraft fuselage.

4. The aircraft door of claim 3, wherein said planking (21) extends flush with said outer flange (61, 201) and flush with said outer contour of said aircraft fuselage.

5. The aircraft door of claim 1, further comprising a ring collar (60) secured to said trough bottom wall (20) to form said trough with a curvature that is open radially outwardly relative to said longitudinal central axis (A) and curved circumferentially of said aircraft fuselage so that said ring collar extends at least partly circumferentially relative to said longitudinal central axis.

6. The aircraft door of claim 5, wherein said ring collar (60) comprises an inner flange (62) connected to said trough bottom wall (20), and an outer flange (61) extending curved and flush with said outer contour of said aircraft fuselage and with said planking (21).

7. The aircraft door of claim 1, wherein said trough is a deep drawn door component comprising said trough bottom wall integrally surrounded by a ring collar (60) to form said trough so that said trough is open radially outwardly relative to said longitudinal central axis (A).

8. The aircraft door of claim 5, wherein said ring collar (60) comprises an outer flange (201) extending flush with said outer contour of said aircraft fuselage and with said planking (21).

9. The aircraft door of claim 8, wherein said outer flange (201) is integrally connected to said ring collar (60).

10. The aircraft door of claim 1, wherein said trough is a laminated structure of fiber composite material.

11. The aircraft door of claim 1, further comprising a vent (O, C) connecting a space inside said trough (20A) to the outer atmosphere, whereby said trough bottom wall is exposed to the atmospheric pressure outside the aircraft and functions as part of the aircraft outer skin.

12. The aircraft door of claim 11, wherein said vent is an opening (O) in said planking (21).

13. The aircraft door of claim 11, wherein said vent is a channel (C) leading from the outside atmosphere into said trough (20A).

14. The aircraft door of claim 13, wherein said vent channel (C) extends between said planking (21) and a recessed flange (201') of said trough from an opening leading from the outer atmosphere into said trough (20A).

15. The aircraft door of claim 1, wherein said door framing (30) comprises stiffening members (31) having first flanges connected radially inwardly to said trough bottom wall and second flanges connected radially outwardly to said planking (21).

16. The aircraft door of claim 1, wherein said trough is a single piece forming a single radially inwardly extending depression and wherein said door framing is mounted in said single piece trough.

17. The aircraft door of claim 1, wherein said door framing consists of ribs extending circumferentially relative to said longitudinal central axis.

18. The aircraft door of claim 1, wherein said door framing consists of beams extending longitudinally relative to said longitudinal central axis.

* * * * *